Patented Feb. 20, 1940

2,191,357

UNITED STATES PATENT OFFICE 2,191,357

METHOD OF TREATING PETROLEUM EMULSIONS

Jesse B. Staten, Wichita Falls, Tex., assignor to Kactus Company, Inc., St. Jo, Tex., a corporation of Delaware No Drawing. Application December 15, 1937, Serial No. 180,027

10 Claims. (Cl. 196—4)

This invention relates to an improvement in the breaking of petroleum oil and water emulsions, and at the same time with the same reagent, removing or preventing paraffin accumulations from the surfaces with which the petroleum comes in contact.

In the recovery of crude petroleum from the underground reservoirs it is frequently found to be contaminated with brine waters of varying mineral content. These waters contain various salts and metals in varying amounts. While it is commonly accepted that such association of crude petroleum and brines are not in an emulsified state while in the underground reservoirs but are more or less stratified, during the necessary processes of lifting or flowing such crude petroleum to the surface and into the surface receptacle, a considerable amount of agitation or mixing occurs often resulting in the dispersing of a considerable part of the water into fine droplets varying in size from below visibility with the most powerful microscope to droplets visible to the unaided eye. The remaining portion of the water not so dispersed, and the largest of the dispersed droplets by settling, usually accompany the mass as so-called free water.

As is well-known in the art, the hardness or mineral content of the brines dispersed in the crude petroleum results in the formation of stable emulsions which require some form of treatment to separate the mineral oil and water so as to render the crude petroleum marketable.

It is also well-known in the art that a large portion of the crude petroleum is accompanied with considerable paraffin which in many cases precipitates on the face of the producing formations, and on the inner surface of the conduits through which the crude petroleum is conveyed to the surface receptacles, and in the surface receptacles. It is also well known that this paraffin in many cases reduces the amount of the crude petroleum recoverable daily by retarding its flow into the conveying conduits and through the conduits to the surface receptacles, requiring some means of removing the paraffin deposits.

An object of the present invention is to utilize cactus juice as a treating agent to react with the hard water salts to break the emulsion, and to retain the cactus juice in the oil phase, it is preferably combined with a fatty acid. I have discovered that cactus juice is effective for this purpose, especially when combined with compounds that are dispersable in the oil phase of the emulsion. Then it is in a dispersable form where its effectiveness for the purpose is obtained, the cactus juice also having a preferential wetting effect.

While I am aware of previous attempts to break petroleum emulsions by the addition of a reagent of a water softening nature, such as was set forth in Barnickel Patent No. 1,223,659, and also many attempts to dissolve paraffin, I have discovered a new and useful method of breaking petroleum emulsions and preventing or removing paraffin accumulations with the same reagent at the same time, requiring the same volume or less of the combined reagent than would be required for breaking the emulsion alone, or dissolving the paraffin alone.

Another advantage of my reagent is in the fact that it is soluble or dispersable in the oil phase rather than in the water phase, thus limiting the water-softening effect to the water that is in suspension or emulsified with the crude petroleum, thus avoiding dissipation of the strength of the reagent in the softening of the water that may have settled out of the emulsified mass.

Briefly described, my invention is a water-softening reagent of a nature that will not mix readily with, or go into solution in the free water accompanying the emulsified mass or the stratified water in the producing formations, but will remain in the oil phase of the emulsified mass, in combination with a reagent of a nature that effects preferential wetting of the producing formations and steel conduits, thus freeing the adhering paraffin, allowing it to be carried out in the flow of the fluid.

While in the old processes of water softening as much as 50 gallons of a reagent to 1000 barrels of the emulsified mass was required, in my invention, five gallons or less of the reagent is required to 1000 barrels of oil, which is adequate not only to soften the water sufficiently to cause the emulsions to break, but also to preferentially wet the surfaces of the formations and the surfaces of the conduits and thus free the paraffin accumulations, and keep such surfaces free from paraffin accumulations.

To break the emulsions and stratify the water and remove or prevent the paraffin accumulations in accordance with the present invention, a reagent comprising either a water suspension or colloidal solution of one or more of the compounds hereinafter mentioned is introduced into the petroleum emulsion of mineral oil and water at any convenient point, preferably at a point that will allow the maximum amount of mixing and agitation of the reagent with the mixtures of brine and crude petroleum, and wet all surfaces that have or may have paraffin accumulations. Or the reagent may be added to the receiving receptacle if more convenient, and if the paraffin is accumulating in the receiving receptacle only.

The reagent used in the present invention comprises a mixture of one or more water softening agents such as a high molecular-weight hydrocarbon having an hydroxyl group or hydrogen replaceable by a metal in combination with a material of high wetting power, such as cactus juice.

While I do not wish to limit the scope of the invention to these forms of the reagent, but for the purposes of illustration only, the following is an example of my process:

A fatty acid of high molecular weight is obtained by reacting castor oil with sulphuric acid in more than the theoretical proportions diluting the mass with a small amount of water, boiling at 100° C. for four hours, thus splitting off the sulphuric acid in combination with the castor oil, draining off the acid water, saponifying the mass with a solution of cactus juices in 26° Baumé ammonia, the amount of the cactus juice being at least equal to the volume of ammonia taken. Since the mixture of acids cannot be definitely determined in general, each batch requires a titration test to determine the amount of alkali needed, as will be evident. A mixture of oils may be used if desired, instead of the castor oil, such as cotton seed oil, castor oil, etc., or a mixture of vegetable oils and mineral oils, such as aromatics, or naphthenics, or such mixtures may be condensed. In fact, any suitable water-softening high molecular weight hydrocarbon, or combinations of such may be found effective, with the limitation that the hydrocarbon or mixtures thereof must have an hydroxyl or hydrogen capable of being replaced by a metal. Or the alkali used for saponification may be potassium hydroxide, sodium hydroxide, or an alkali may be used, such as iron, zinc, etc., or combinations of the above, when incorporated with the extracted juices of the cacti.

The fatty acid combines with the cactus juice to disperse the latter in the oil phase of the emulsion where its full effectiveness can be obtained efficiently.

I claim:

1. A method of breaking petroleum emulsions of the water-in-oil type comprising treating the emulsion with cactus juice.

2. A method of breaking petroleum emulsion of the water-in-oil type comprising subjecting the oil phase of the emulsion to the action of cactus juice.

3. A method of breaking petroleum emulsions of the water-in-oil type comprising subjecting the emulsion to the water-softening effect of a saponified hydrocarbon or mixture of hydrocarbons of high molecular weight to which cactus juice has been added.

4. A method of breaking petroleum emulsions of the water-in-oil type comprising subjecting the emulsion to the water-softening effect of a saponified high molecular weight hydrocarbon containing an alkaline solution of cactus juice.

5. A method of breaking petroleum emulsions of the water-in-oil type comprising subjecting the emulsion to the water-softening effect of a reagent comprising a high molecular weight hydrocarbon saponified with an alkali extract of cactus juice.

6. A method of breaking petroleum emulsions of the water-in-oil type comprising subjecting the emulsion to the water-softening effect of a reagent containing a water softening alkali, a fatty acid, and an extract of cacti.

7. A method of breaking petroleum emulsions of the water-in-oil type comprising subjecting the emulsion to the water-softening effect of a reagent obtained by the saponification of a condensation product of fatty acids and aromatic or naphthenic compounds with an alkaline solution of cactus juice.

8. A method of breaking down petroleum emulsions of the water-in-oil type comprising subjecting the emulsion to the water-softening effect of a reaction product of one of the class consisting of a saponified fatty acid, naphthene and aromatic compounds, with an alkaline solution of extracted cactus juice.

9. A method of breaking petroleum emulsions of the water-in-oil type comprising subjecting the emulsion to the water-softening effect of a mixture of fatty acids obtained by sulphonating castor oil and boiling the product with dilute mineral acid, thus splitting off the acid, and saponifying the resulting mixture of fatty acids with an ammonium solution of cactus juice.

10. A method of breaking petroleum emulsions of the water-in-oil type comprising subjecting the emulsion to the water-softening effect of a reagent containing a mixture of fatty acids obtained by sulphonating castor oil and boiling the product with dilute sulphuric acid, thus splitting off the sulphuric acid, saponifying the resulting mixture of fatty acids with a solution of cactus juice in ammonia.

JESSE B. STATEN.